Jan. 26, 1965     J. W. MARCUS     3,166,853
MACHINIST'S ANGLE GAUGE AND SUPPORT
Filed April 26, 1962     2 Sheets-Sheet 1
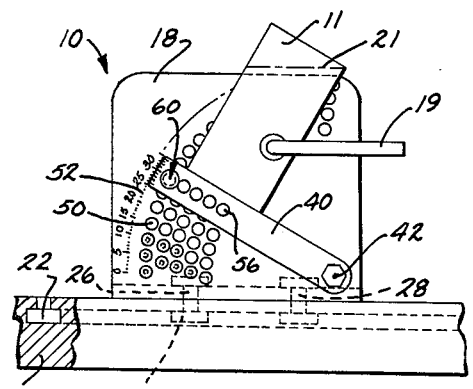
FIG. 1.
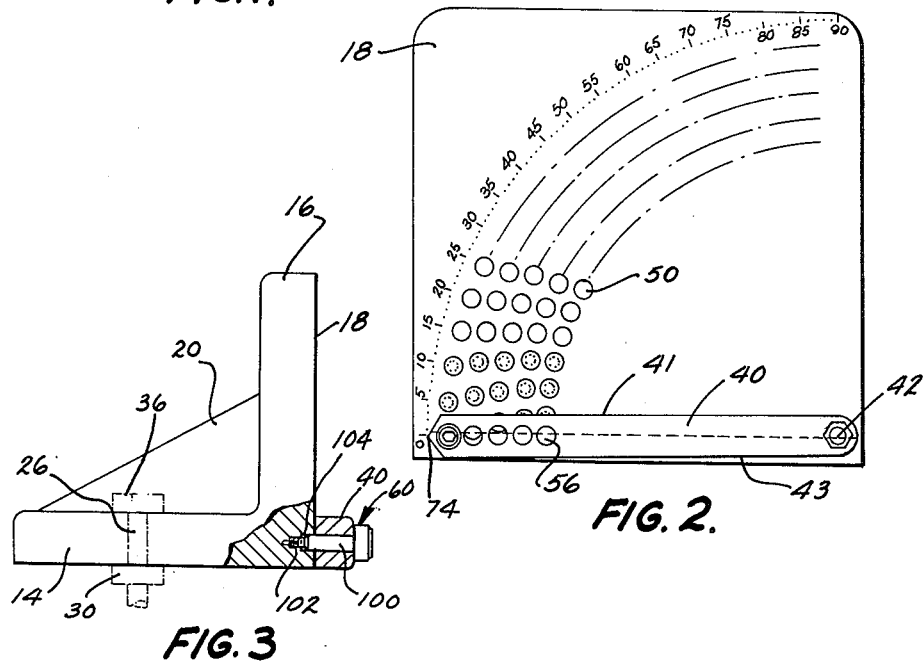
FIG. 2.
FIG. 3
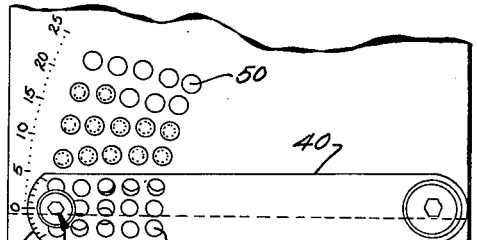
FIG. 4.
INVENTOR.
JAMES W. MARCUS
BY
ATTORNEYS Jan. 26, 1965    J. W. MARCUS    3,166,853
MACHINIST'S ANGLE GAUGE AND SUPPORT
Filed April 26, 1962    2 Sheets-Sheet 2

INVENTOR.
JAMES W. MARCUS
BY
ATTORNEYS

United States Patent Office 3,166,853
Patented Jan. 26, 1965

3,166,853
MACHINIST'S ANGLE GAUGE AND SUPPORT
James W. Marcus, 1423 Slayton St., Grand Haven, Mich.
Filed Apr. 26, 1962, Ser. No. 190,436
1 Claim. (Cl. 33—174)

This invention relates to a machine shop gauge, and more particularly to a machinist's angle gauge and support enabling accurate angular machining and/or inspection of a workpiece.

The art of accurately positioning a workpiece on an angle with respect to a base surface is ordinarily a complex process requiring a high degree of skill. For example, when machining a corner of a rectangular block, the machinist must shim up one end of a conventional "sine bar" with a plurality of gauge blocks piled upon one another under the sine bar. The dimensions and number of gauge blocks utilized to shim the sine bar are determined from a handbook which indicates the "sine" or height required for a particular angle. As can be readily realized, this is a process requiring a high degree of skill for a proper determination of a handbook figure, and then choosing and compiling the plurality of gauge blocks or the like. Further, after the sine bar is positioned at the proper angle, the workpiece to be machined must be mounted so that it will not be dislodged when the tool machines it. A machinist ordinarily has no way of positively and accurately determining the actual angle on the workpiece until the machining step is done and a check is made, since the sine bar and gauge blocks are held in place by gravity only.

In cases where a handbook is not available, angles or gauge block heights must be computed using trigonometry. This is time consuming and the possibility of error is great.

It is therefore an object of this invention to provide a machinist's gauge and support for positioning a workpiece on an angle relative to a base surface on the workpiece, and which does not require a sine bar, gauge block shims, a handbook, special skill and/or other paraphernalia conventionally required.

It is another object of this invention to provide a machinist's angle gauge and support that provide rigid support, that is easy to manipulate even by a relatively unskilled person, and that can be accurately set at an angle which is clearly indicated on the device.

It is another object of this invention to provide a machinist's angle cutting gauge that can readily be set to enable positioning of a workpiece at fractional angles in spite of its simplicity.

It is moreover, relatively inexpensive to produce, and can be formed all in one assembled unit.

It is another object of this invention to provide a combined workpiece gauge and support that may be used to inspect angles on a workpiece, may be used to set the angle of a machine tool to prevent scrap, and may also be used for lay-out, milling, drilling, jig boring, and grinding.

These and several other objects of this invention will be apparent upon studying the following specification, in conjunction with the drawings, in which:

FIG. 1 is a front elevational view of one form of the inventive device shown mounted on the bed of a machine, such as a milling machine;

FIG. 2 is a front elevational view of a second form of the invention;

FIG. 3 is an end, partially sectional, elevational view of the inventive device showing one form of connecting and aligning means between the adjustable portion of the device and the fixed portion of the device;

FIG. 4 is an enlarged, fragmentary, front elevational view of a third form of the inventive device;

Figure 5:
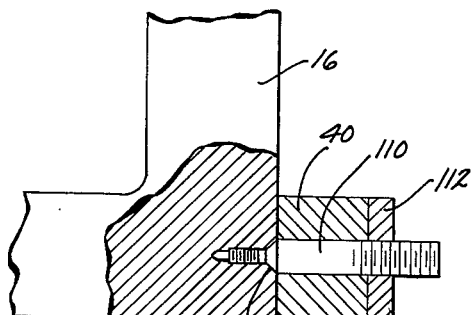
FIG. 5 is a fragmentary, partially sectioned, end elevational view of a modified form of connecting and aligning means.

Basically, the inventive machinist's gauge and support means comprises a base, preferably adapted to be mounted in aligned manner on the bed of a machine, a vertically extended portion including a gauge surface, an elongated gauge sweep member having one end pivotally attached to the gauge surface and the body of the elongated member adapted to sweep over an arc of approximately 90° on the gauge surface, a plurality of openings extending over the arc adapted to cooperate with connecting and aligning means on the end of said elongated member opposite the pivotally mounted end, and cooperating indicia means on the sweep member and the gauge surface to indicate the angle setting therebetween. The openings in the gauge surface are preferably in a series of adjacent rows cooperable with a plurality of openings in the end opposite the pivotally mounted end of the elongated sweep member, to provide the variable angular settings indicated by the cooperating indicia means. The upper surface of the elongated member is accurately machined at a particular angle with respect to the centerline extending between the pivotal mount of the elongated member and the central indicia means on the outer end of the member. The connection and aligning means between the member and the surface preferably includes threaded connecting means and abutting angular surface aligning means between a bolt or screw (e.g. a cap screw) and the openings.

Referring to the drawings, in the form of the invention illustrated in FIG. 1, the novel gauge 10 is shown mounted upon the bed or table 12 of a machine such as a milling machine. The gauge 10 includes a base 14 (FIG. 3), and an upwardly extending portion 16 having a guide or gauge surface 18 on the front face thereof. Preferably, diagonal web strengthening members 20 extend between the base and upright portion for more rigid support. The base 14 may be accurately aligned with the conventional keyway 22 of bed 12 by utilizing a plurality of inverted bolts 26 and 28 having conventional rectangular shaped key portions 30 adjacent the bolt head 34 and adapted to interfit in the upper portion of the inverted T-shaped keyway above the lower head. The nuts 36 above the base 14 retain the assembly on the keyway. Obviously, other equivalent alignment means can be used. In some cases no alignment is needed or desired, for example in layout work.

The guide face has mounted thereon an elongated sweep member 40 pivotally connected at 42 so that the opposite end of member 40 may move or sweep over an arc approximately 90° in scope. In the guide face 18, extending over the 90° arcuate range, is a plurality of openings 50 preferably arranged in a series of adjacent rows. Each row provides a differential of 1° or ½° or other desired value. Each opening is accurately machined both for location and for axial accuracy to achieve exact alignment with the sweep member. The base of each opening 50 includes a tapped i.e. threaded hole for holding, and a straight or angular positioning hole portion for alignment. Angular indicia means 52 on the face adjacent the openings, is provided for a purpose explained hereinafter. This indicia means may be inlaid for minimum wear.

Figure 7:
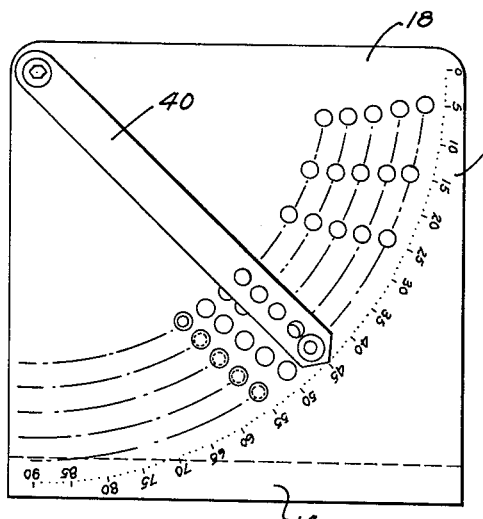
FIG. 7 is a front elevational view of a fourth form of the inventive device.

In the arcuately moving end of elongated member 40 is a plurality of openings 56 adapted to successively coincide with selected ones of openings 50. The connecting and alignment means between the sweep member and guide face includes bolt or screw 60 to align, and retain aligned, specified openings 50 and 56 with each other to achieve a particular angular setting. The openings 56 in the elongated member 40 may be arranged in a single row as illustrated in FIGS. 1, 2 and 7, or may be in a plurality of rows, e.g. three rows as shown in FIG. 4. Obviously, the accuracy of angular settings will be greater with the increased number of rows.

Cooperating with indicia means 52 on face 18, is indicia means 72 on the outer end of elongated member 40. The two indicia means 72 and 52, when associated, reveal the exact angular setting between selected openings 50 and 56. This indicia means 72 may cooperate with indicia means 52 to provide a vernier affect for extremely accurate settings. On the other hand, the indicia means may merely comprise a pointer as shown at 74 in FIG. 2, in a simpler form of the invention, or numerals, as long as the angle is indicated by the cooperation of the two indicia means. The apparatus illustrated in FIG. 4 is capable of indicating fractional angles, while the apparatus in FIG. 4 will enable fractional angle settings only with added elongated sweep members in a manner to be explained hereinafter.

The upper surface of elongated member 40 is accurately machined with respect to a centerline extending between the center of pivotal mount 42, and the central part of indicator means 72. In the apparatus as illustrated in FIGS. 1 and 4, the upper surface is exactly parallel with this centerline, i.e. no angle exists therebetween. In the apparatus as illustrated in FIG. 2, the upper surface 41 again is parallel to the line between 42 and 74 (i.e. 0°), while the lower surface 43 is at an acute angle of ½° with respect to the centerline. Thus, by disconnecting mounting stud 42, elongated member 40 may be inverted so that surface 43 is on top, thereby enabling half degree angles to be measured, i.e. ½°, 1½°, 2½° etc.

A workpiece 11, when placed upon the upper surface of the elongated member 40, is positioned at an angle determined by the setting between the openings 52 and 56. A suitable clamping means, such as a C-clamp 19 or any equivalent, is utilized to rigidly secure the workpiece 11 to the face 18 of the rigid upright portion 16. When the workpiece is at the proper setting and secured in place, the portion of the workpiece is then machined along the predetermined specific angle, indicated for example by phantom line 21. The correlative indicia means clearly indicate to the machinist the angle so that he knows this information before the machining operation begins, thereby reducing scrap rate.

The particular connecting and aligning means 60 which may be utilized to align and retain the openings in proper relationship, may vary in form. For example, the holding means may assume the form of a slender bolt or cap screw 100 as illustrated in FIG. 3 with inter-connecting thread portions 102 into the socket portion of openings 50. The alignment means may in the simplest less preferred form be merely the interfit between the cylindrical body or shank of the bolt and the cylindrical opening 50 as in FIG. 3, with a clearance being left at 104.

Figure 6:
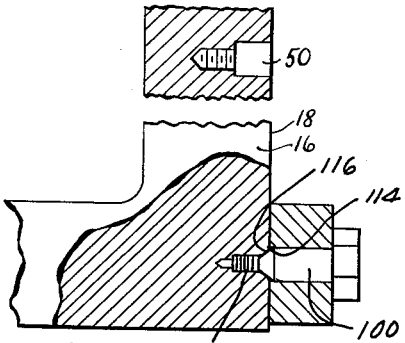
FIG. 6 is an end elevational, fragmentary, partially sectioned view of a further modified form of connecting and aligning means.

On the other hand, the aligning means preferably assumes the form of accurately machined abutting frusto-conical or tapered surfaces 108 as illustrated in FIG. 5. These are accurately machined to effect exacting locations down to 1 or 2 minutes of a degree. In this form of the invention, instead of a bolt, a stud 110 including a nut 112 on its outer end adjacent elongated member 40, may be used. As another possibility, a tapered frusto-conical surface 114 on the bolt 100 as illustrated in FIG. 6, may cooperate with a convexly curved angular annular surface 116 in opening 50. Here again, threaded connecting means 102 may be utilized.

The threaded holding means is the simplest and easiest to form. Other holding means can conceivably be substituted, however, such as cooperating, small angle tapered surfaces between the bolt and opening for frictional holding.

Instead of the elongated member being pivotally mounted at the lower corner, e.g. the lower righthand corner of surface 18, it may be pivotally mounted in one of the upper corners, for example, in the upper lefthand corner as shown in FIG. 7.

Figure 9:
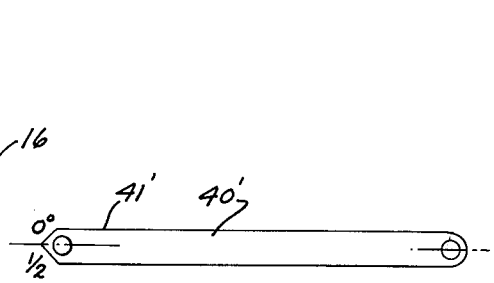
FIG. 9 is a front elevational view of one of the sweep members utilized in the apparatus of FIG. 8.
Figure 10:
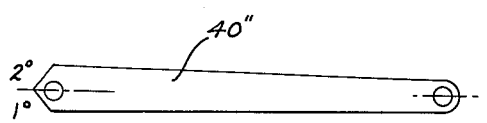
FIG. 10 is a front elevational view of the second sweep member.
Figure 8:
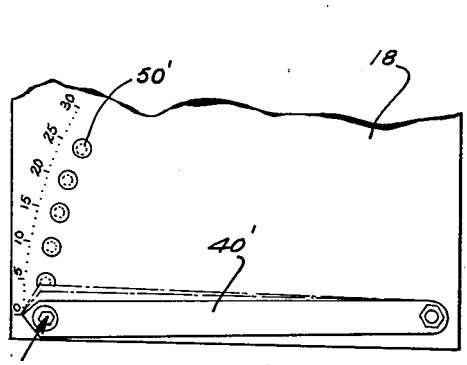
FIG. 8 is a fragmentary, front elevational view of the fifth form of the device utilizing a plurality of different elongated arcuate adjustable, sweep members.
Figure 11:
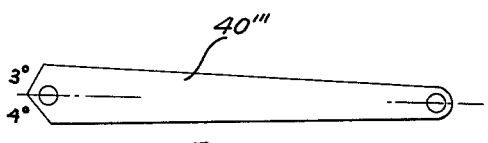
FIG. 11 is a front elevational view of a third sweep member utilized with the apparatus in FIG. 8.

In the simplest form of this invention, it may be desirable to provide only one arcuate series of openings 50' as illustrated in FIG. 8 in the face of face 18 of the upright portion, rather than a series of rows. In this simple form of the invention, only one opening is provided in the end of elongated member 40' through which connecting means 60 is placed to interfit with an opening 50'. In order to achieve small angular settings between 0° and 5°, 5° and 10° etc., using this form of the apparatus, a series of different sweep members 40', 40'', and 40''', as illustrated in FIGS. 9 through 11, is utilized. One surface 41' of member 40' is arranged to be parallel with the centerline of the member, i.e. at an angle of zero degrees, while the opposite surface is preferably arranged at one-half degree (½°). In member 40'', one surface is at an angle of 1°, with the opposite surface being at an angle of 2°. In member 40''', one surface is at an angle of 3° with the opposite surface at an angle of 4°.

Therefore, by attaching selected one of these sweep members and inverting them as needed, the appropriate angles of 0°, ½°, 1°, 2°, 3° and 4° may be achieved. Or if the connecting means 60 is inserted between the opening in the elongated member and the 5° opening 50', angles of 6°, 7°, 8° and 9° may be obtained, and so forth. Obviously, this form of the invention is not as convenient or versatile as the other forms of the invention illustrated.

In order for a machinist to utilize the novel apparatus to machine the corner or an angular portion of a workpiece 11 with respect to its flat base surface, be merely mounts the novel device on the table or bed of his machine, utilizing the conventional keyways 22. When the device is accurately attached by bolts 26 and 28, he moves the elongated sweep 40 arcuately over the face 18 until the indicia means on the elongated member cooperate with the indicia means on the face to indicate the desired angle. He then screws connecting and aligning bolt 60 through the particular opening 56 and into opening 50 aligned at that angle. This retains the elongated member fixedly at that angle. Then he places workpiece 11 on the upper surface of elongated member 40, and clamps it in place against face 18 as by a C-clamp 19. He is then ready to machine along the set angle, and can do so accurately and easily after the relatively short set up time.

While the invention has been explained with respect to milling a corner of a workpiece, it may also be used for inspection of workpiece angles, grinding, jig boring, drilling, layout work, and in some instances even to accurately set the angle of a machine tool.

It will be obvious to those skilled in the art, that various modifications other than those several modifications disclosed, may be made to the apparatus depending upon the circumstances involved, without departing from the principles of the invention as taught herein. Such obvious modifications are deemed to be part of this invention.

I claim:

A machinist's angle gauge comprising: a support base adapted to be mounted on the bed of a machine; a rigid, upright, workpiece-supporting portion including a guide surface; an elongated member having one end pivotally mounted to said upright portion, and said member adapted to move in approximately a 90° arc over said guide surface; a plurality of spaced accurately machined internally threaded, circular openings over the range of said arc; angular indicia means on said upright portion adjacent said openings; said elongated member having at least one opening and indicia means at its second end, and having an upper workpiece supporting surface immediately adjacent said upright portion to support a workpiece in an exact vertical and angular position; said upper surface being accurately machined with respect to the centerline between its pivotal mount and said end indicia means for accurate workpiece orientation; connecting and alignment means between said second end and said openings, including a bolt adapted to fit through said end opening with close tolerance and into tightenable engagement inside said surface openings, whereby said upper surface of said elongated member can be angularly varied to provide a desired angular setting for positioning said workpiece; and said elongated member including a lower surface at a fractional acute angle with respect to the centerline between said pivotal mount and said end indicia means whereby said member can be inverted to enable gauging of fractional angles for said workpiece.

References Cited in the file of this patent

UNITED STATES PATENTS

| | | |
|---|---|---|
| 1,065,994 | Williams | July 1, 1913 |
| 1,308,451 | Schachat | July 1, 1919 |
| 1,809,058 | Miner | June 9, 1931 |
| 2,342,539 | Gorton | Feb. 22, 1944 |
| 2,366,385 | Comfort | Jan. 2, 1945 |
| 2,385,396 | Baum | Sept. 25, 1945 |
| 2,555,351 | Lowe | June 5, 1951 |
| 2,735,182 | Kalberer | Feb. 21, 1956 |
| 3,040,434 | Yarosz | June 26, 1962 |